US012774621B2

(12) United States Patent
Yu et al.

(10) Patent No.: US 12,774,621 B2
(45) Date of Patent: Oct. 27, 2026

(54) COMPONENT HOUSING FOR A MOTOR VEHICLE LOCK COMPONENT

(71) Applicant: Brose Schliesssysteme GmbH & Co. Kommanditgesellschaft, Wuppertal (DE)

(72) Inventors: Jai-Kwon Yu, Duesseldorf (DE); Serkan Guelkan, Hattingen (DE)

(73) Assignee: Sartorius Stedim Biotech GmbH, Goettingen (DE)

( * ) Notice: Subject to any disclaimer, the term of this patent is extended or adjusted under 35 U.S.C. 154(b) by 383 days.

(21) Appl. No.: 18/279,665

(22) PCT Filed: Feb. 28, 2022

(86) PCT No.: PCT/EP2022/054905
§ 371 (c)(1),
(2) Date: Mar. 22, 2024

(87) PCT Pub. No.: WO2022/184603
PCT Pub. Date: Sep. 9, 2022

(65) Prior Publication Data
US 2024/0240500 A1 Jul. 18, 2024

(30) Foreign Application Priority Data
Mar. 3, 2021 (DE) ..................... 10 2021 105 156.8

(51) Int. Cl.
*E05B 85/02* (2014.01)
*E05B 79/08* (2014.01)
*E05B 85/28* (2014.01)

(52) U.S. Cl.
CPC .............. *E05B 85/02* (2013.01); *E05B 79/08* (2013.01); *E05B 85/28* (2013.01)

(58) Field of Classification Search
CPC .......... E05B 85/02; E05B 85/28; E05B 79/08; E05B 79/12; E05B 79/14; E05B 79/18;
(Continued)

(56) References Cited

U.S. PATENT DOCUMENTS

| | | | | |
|---|---|---|---|---|
| 2017/0234039 | A1 | 8/2017 | Taga | |
| 2020/0080352 | A1 * | 3/2020 | Kin | E05B 79/22 |

FOREIGN PATENT DOCUMENTS

| | | |
|---|---|---|
| DE | 19955693 | 5/2001 |
| DE | 10144166 | 4/2003 |

(Continued)

OTHER PUBLICATIONS

Machine translation and numbered paragraphs for DE 10144166 B4 (Year: 2007).*

(Continued)

*Primary Examiner* — Christine M Mills
*Assistant Examiner* — Christopher F Callahan
(74) *Attorney, Agent, or Firm* — Pauly, DeVries Smith & Deffner LLC

(57) ABSTRACT

Various embodiments relate to a component housing for a vehicle lock component, wherein the component housing has a housing part, in particular housing upper part, with an installation opening and a covering part with a cover portion, which is designed to at least partially close the installation opening. The component housing can have a hinge arrangement with at least one hinge, by which the covering part, in a starting position in which the covering part is spaced apart from the installation opening and releases same, is movably connected to the housing part, that the hinge arrangement has at least one film hinge as a hinge, and that, with the involvement of the at least one film hinge, the covering part can be brought out of the starting position into at least two
(Continued)

different latching positions in which the covering part is in each case latched to the housing part.

19 Claims, 3 Drawing Sheets

(58) Field of Classification Search
CPC .. E05B 79/20; E05B 79/22; E05B 2015/0472; E05B 15/1635
See application file for complete search history.

(56) References Cited

FOREIGN PATENT DOCUMENTS

| | | | | | |
|---|---|---|---|---|---|
| DE | 10144166 | B4 | * | 12/2007 | ............. E05B 85/02 |
| DE | 102018105550 | | | 9/2019 | |
| EP | 3214242 | | | 9/2017 | |
| JP | 2002129813 | A | * | 5/2002 | |
| WO | 2022184603 | | | 9/2022 | |

OTHER PUBLICATIONS

Machine translation and numbered paragraphs for JP 2002129813 A (Year: 2002).*
"German Search Report," for German Patent Application No. 102021105156.8 (corresponding to our file 218.0268USWO) mailed Jan. 14, 2022 (8 pages).
"International Search Report and Written Opinion," for PCT Application No. PCT/EP2022/054905 (corresponding to our file 218.0268USWO) mailed May 31, 2022 (9 pages).

* cited by examiner

COMPONENT HOUSING FOR A MOTOR VEHICLE LOCK COMPONENT

CROSS-REFERENCE TO RELATED APPLICATIONS

This application is a national stage application under 35 U.S.C. 371 of International Patent Application Serial No. PCT/EP2022/054905, entitled "Component Housing for a Motor Vehicle Lock Component," filed Feb. 28, 2022, which claims priority from German Patent Application No. DE 10 2021 105 156.8, filed Mar. 3, 2021, the disclosure of which is incorporated herein by reference.

FIELD OF THE TECHNOLOGY

Various embodiments relate to a component housing for a motor vehicle lock component of a motor vehicle, to a motor vehicle lock component, and to a method for installing a motor vehicle lock component.

BACKGROUND

The known motor vehicle lock component (DE 10 2018 105 550 A1), on which various embodiments are based, has a component housing with a housing part, which has an installation opening, in which the Bowden cable is coupled in terms of drive to a further train component of the drive train of the motor vehicle lock component, in particular to an actuating lever. The component housing further comprises a covering part with a cover portion, which serves to close the installation opening after the Bowden cable is inserted from the outside into the housing interior and after the Bowden cable is coupled to the other train component.

The installation of a Bowden cable on the relevant motor vehicle lock component is also of particular significance for efficient production. Thus, it is advantageous if the space portion in the housing interior, in which the Bowden cable is coupled to the other train component, is as easily accessible as possible during the installation. For this purpose, it is desirable if the covering part, which is intended to close the installation opening afterwards, is as far away from the installation opening as possible during the installation, and therefore the covering part does not unnecessarily obstruct the installation and especially the view into the interior of the component housing during the installation. It is also desirable if the covering part can be handled as simply as possible after the coupling of the two train components, namely the Bowden cable to the respective other train component, in order to close the installation opening.

SUMMARY

The problem on which some embodiments are based is to design and develop the known component housing in such a manner that the installation of the motor vehicle lock component is simplified as a whole.

The above problem is solved, in a component housing for a motor vehicle lock component of a motor vehicle according to various features provided herein.

Such a motor vehicle lock component may be any component which performs a function within the scope of a motor vehicle lock system. Such motor vehicle lock components are, for example, motor vehicle locks or opening auxiliary drives (opening aids) and closing auxiliary drives (closing aids) for motor vehicle locks or the like. The actuation of such a motor vehicle lock component can be carried out manually or by motor. A Bowden cable can be provided for transmitting the manual or motorized actuating forces to a train component of the drive train of the motor vehicle lock component.

Essential to some embodiments is firstly the basic idea of providing the covering part together with a housing part of the component housing, which has the installation opening, in the connected state, such that the covering part is already arranged captively on the housing part in advance of the installation. In this way, after two corresponding train components have been coupled to each other in a space portion in the housing interior, the covering part can be easily gripped and brought to or into the installation opening.

It can also be that the covering part is movably connected to the housing part by a hinge arrangement. This makes it particularly easy to handle the covering part in order to close the installation opening. In particular, the installation movement, which has to be carried out by the covering part for closing the installation opening, is guided by the hinge arrangement, which further simplifies the closing of the installation opening. For this purpose, the hinge arrangement has at least one film hinge, as a result of which the hinge arrangement is constructed particularly simply. In the case of a film hinge, the two hinge elements which are pivotable with respect to each other, hereinafter referred to as hinge wings, are designed in a single piece together, wherein the material portion connecting the two hinge wings, hereinafter referred to as a joint portion, is a particularly flexible material portion of the hinge arrangement in relation to the hinge wings. The joint portion is formed in particular by a reduction in cross section in relation to the material portions forming the two hinge wings. The joint portion and the two hinge wings can be formed from a plastics material. This can also be true of the housing part with the installation opening and/or the covering part with the cover portion, wherein the housing part and/or the covering part can also in each case themselves form one of the hinge wings of the hinge arrangement and in particular of the film hinge. In some embodiments, the housing part and/or the covering part are formed integrally together with at least one further hinge wing and in particular together with the hinge arrangement. In some embodiments, the housing part, covering part and hinge arrangement form an integral unit.

It can also that the covering part can be brought into two latching positions, in which the covering part is latched to the housing part, with the involvement of the film hinge. This has the further advantage that the covering part can first be brought into a favorable position for the delivery and storage of the component housing before installation, in which position the covering part, for example, does not protrude unfavorably in relation to the housing part, then can be latched to the housing part such that the installation opening is released as before and allows the train components to be coupled in the interior thereof, and can finally be brought into the further latching position for the purpose of closing the installation opening.

In detail, it is now proposed that the component housing has a hinge arrangement with at least one hinge, by which the covering part, in a starting position in which the covering part is spaced apart from the installation opening and releases same, is movably connected to the housing part, that the hinge arrangement has at least one film hinge as a hinge, and that, with the involvement of the at least one film hinge, the covering part can be brought out of the starting position into at least two different latching positions in which the covering part is in each case latched to the housing part.

Various embodiments include two different latching positions in which the covering part can be latched in each case to the housing part. Thus, a first latching position is defined here, from which the covering part can be brought into a second latching position without releasing the latching which the covering part has already entered into with the housing part in the first latching position. In the one latching position, the covering part further releases the installation opening and in the other, the covering part closes the installation opening at least partially, in particular completely. Particular locations at which the covering part can be latched to the housing part are specified for the respective latching position in some embodiments.

According to various embodiments, the hinge arrangement has at least two hinges with different geometric hinge axes. As already explained previously, at least one of the hinges is a film hinge. In some embodiments, at least two hinges are film hinges. However, it is also conceivable that at least one hinge is a rotary hinge and/or a ball and socket joint. It is also conceivable furthermore to provide, instead of one of the hinges, a predetermined breaking point between the covering part and the hinge arrangement. The latter is then designed in particular in such a way that it breaks only after reaching one of the latching positions, in particular the first and/or second latching position. In some embodiments, however, the hinge arrangement is also maintained in the first and/or second latching position of the covering part, i.e. is free from damage.

A hinge arrangement with at least two, such as precisely two, hinges are the subject matter of some embodiments. In some embodiments, the hinge arrangement has a dimensionally stable connecting piece which is arranged between two joint portions of the hinge arrangement. Such a hinge arrangement thus has two hinges, i.e. two joints, in the connecting piece between the covering part and the housing part, such that the covering part can be pivoted relative to the housing part in two different ways.

According to various embodiments, the hinge arrangement guides the covering part, when moving, past a housing portion which protrudes in relation to the upper side of the housing part, in particular a reinforcement strut. The hinge arrangement provided according to the proposal thus also allows local reinforcements or other protruding portions to be provided on the housing, without thereby interfering with the movement of the covering part out of the starting position.

According to various embodiments, the covering part in the second latching position, i.e. when it closes the installation opening, covers a space portion in which two train components of the drive train of the motor vehicle lock component are coupled to each other in terms of drive. In various embodiments, the one train component is a Bowden cable and/or the other train component is an actuating lever.

According to various embodiments, a motor vehicle lock component, in particular a motor vehicle lock or an opening or closing aid assigned to a motor vehicle lock, is provided, having a drive train, which has a plurality of train components coupled to one another in terms of drive, for actuating a locking mechanism having a pawl and a lock latch, and having a component housing according to the proposal, in which the first train component of the drive train is coupled in terms of drive to the second train component of the drive train. In this respect, reference may be made to all the statements regarding the component housing according to the proposal.

According to various embodiments, the pawl can be lifted out by actuation of the Bowden cable or the lock latch pushed open or closed.

According to various embodiments, a method for installing a motor vehicle lock component according to the proposal is provided, in which the housing part is provided with the covering part in the starting position, in which the first train component of the drive train, in particular the Bowden cable, is then guided from the outside into the space portion and coupled in terms of drive to the second train component of the drive train, in particular to the actuating lever, in which, before or after the insertion of the Bowden cable from the outside into the space portion, with the involvement of the at least one film hinge, the covering part from and beyond the starting position is latched in the one, in particular first, latching position, and in which, after the Bowden cable is inserted from the outside into the space portion and after the covering part is latched in the one, in particular first, latching position, with the involvement of the at least one film hinge, the covering part is latched in the other, in particular second, latching position, at least partially closing the installation opening. In this respect, reference may be made to all the statements regarding the component housing according to the proposal and to the motor vehicle lock component according to the proposal.

Various embodiments provide a component housing for a motor vehicle lock component of a motor vehicle, wherein the component housing has a housing part, in particular housing upper part, with an installation opening and a covering part with a cover portion, which is designed to at least partially close the installation opening, wherein the component housing has a hinge arrangement with at least one hinge, by which the covering part, in a starting position in which the covering part is spaced apart from the installation opening and releases same, is movably connected to the housing part, in that the hinge arrangement has at least one film hinge as a hinge, and in that, with the involvement of the at least one film hinge, the covering part can be brought out of the starting position into at least two different latching positions in which the covering part is in each case latched to the housing part.

In various embodiments, the covering part can be brought, in particular can be pivoted, out of a first of the latching positions, while maintaining the latching of the covering part to the housing part, into a second of the latching positions, wherein the covering part can be brought out of the starting position firstly into the first latching position and then into the second latching position.

In various embodiments, in the one, in particular first, latching position, the covering part further releases the installation opening and in the other, in particular second, latching position, the covering part at least partially, in particular completely, closes the installation opening.

In various embodiments, in the one, in particular first, latching position, the covering part is latched to the housing part on a first side of the installation opening and in the other, in particular second, latching position, the covering part is additionally latched to the housing part on another side of the installation opening, in particular opposite the first side.

In various embodiments, the hinge arrangement has at least two hinges with different geometric hinge axes, of which at least one is a film hinge, wherein at least two hinges, in particular all the hinges, of the hinge arrangement are film hinges or in that at least one hinge of the hinge arrangement is a rotary hinge and/or at least one hinge of the hinge arrangement is a ball and socket joint, and/or wherein the hinge arrangement furthermore has at least one predetermined breaking point between the covering part and the hinge arrangement.

In various embodiments, the covering part can be brought out of the starting position into the one, in particular first, latching position and/or out of the one, in particular first, latching position into the other, in particular second, latching position without destroying the hinge arrangement, in particular a joint portion of the hinge arrangement.

In various embodiments, the at least two hinges have hinge axes which are angled, in particular are orthogonal or oblique, with respect to one another or are parallel to one another.

In various embodiments, the hinge arrangement has a dimensionally stable connecting piece between the two geometric hinge axes, wherein the housing part and the dimensionally stable connecting piece together with the respective joint portion connecting them form a first of the hinges and in that the covering part and the dimensionally stable connecting piece together with the respective joint portion connecting them form a second of the hinges.

In various embodiments, the dimensionally stable connecting piece is curved or rectilinear.

In various embodiments, the covering part is pivotable together with the dimensionally stable connecting piece relative to the housing part about the geometric hinge axis of the first hinge from the starting position into the one, in particular first, latching position, in particular about a pivot angle of at least 160°, of at least 170°, or of at least 180°, and/or wherein the covering part is pivotable relative to the housing part, in particular without further pivoting of the dimensionally stable connecting piece relative to the housing part, about the geometric hinge axis of the second hinge from the one, in particular first, latching position into the other, in particular second, latching position, in particular about a pivot angle of at least 90°, of at least 110°, or of at least 130°.

In various embodiments, the hinge arrangement guides the covering part, when moving from the starting position in the direction of the first latching position, past a housing portion which protrudes in relation to the upper side of the housing part and which extends in particular as far as the edge of the installation opening, wherein the housing portion is a reinforcement strut of the housing part.

In various embodiments, the covering part in the second latching position covers a space portion of the housing interior that is accessible from the outside via the installation opening, in which space portion, in the mounted state, a first train component of a drive train of the motor vehicle lock component, which train component is guided from the outside into the space portion, is coupled in terms of drive to a second train component of the drive train, which train component is movably mounted in the space portion, wherein the first train component is a Bowden cable and/or the second train component is an actuating lever, further wherein, in the mounted state, the covering part in the second latching position secures the Bowden cable on the housing part, wherein the covering part releases the Bowden cable in the first latching position.

Various embodiments provide a motor vehicle lock component, in particular motor vehicle lock or an opening or closing aid assigned to a motor vehicle lock, having a drive train, which has a plurality of train components coupled to one another in terms of drive, for actuating a locking mechanism having a pawl and a lock latch, and having a component housing as described herein, in which the first train component of the drive train, in particular the Bowden cable, is coupled in terms of drive to the second train component of the drive train, in particular to the actuating lever.

In various embodiments, in the mounted state, the Bowden cable, in particular via the actuating lever, upon the actuation thereof, in particular a motorized or manual actuation, brings about lifting of the pawl out of an engagement position, in which it blocks the lock latch in a locking position against opening in the direction of its open position, or it causes the lock latch to be pushed out of a locking position or the lock latch to be pulled into a locking position.

Various embodiments provide a method for installing a motor vehicle lock component as described herein, wherein the housing part is provided with the covering part in the starting position, wherein the first train component of the drive train, in particular the Bowden cable, is then guided from the outside into the space portion and coupled in terms of drive to the second train component of the drive train, in particular to the actuating lever, wherein, before or after the insertion of the Bowden cable from the outside into the space portion, with the involvement of the at least one film hinge, the covering part from and beyond the starting position is latched in the one, in particular first, latching position, and wherein, after the Bowden cable is inserted from the outside into the space portion and after the covering part is latched in the one, in particular first, latching position, with the involvement of the at least one film hinge, the covering part is latched in the other, in particular second, latching position, at least partially closing the installation opening.

BRIEF DESCRIPTION OF THE DRAWINGS

Various aspects will be explained in more detail below with reference to a drawing illustrating merely exemplary embodiments. In the drawing FIG. 1 schematically shows a motor vehicle lock component according to the proposal having a component housing according to the proposal a) after installation, b) before installation, and c) in a detailed view with two coupled train components.

DETAILED DESCRIPTION

The component housing 1 according to the proposal that is illustrated in two exemplary embodiments in the figures is assigned to a motor vehicle lock component 2 according to the proposal of a motor vehicle. The motor vehicle lock component 2 may be any component of a motor vehicle lock system, as will be explained below. In the present case, it is essential that an actuating force is transmitted to the motor vehicle lock component 2 or starting from the motor vehicle lock component 2. The actuating force can be a manual or a motorized actuating force.

Figure 1:
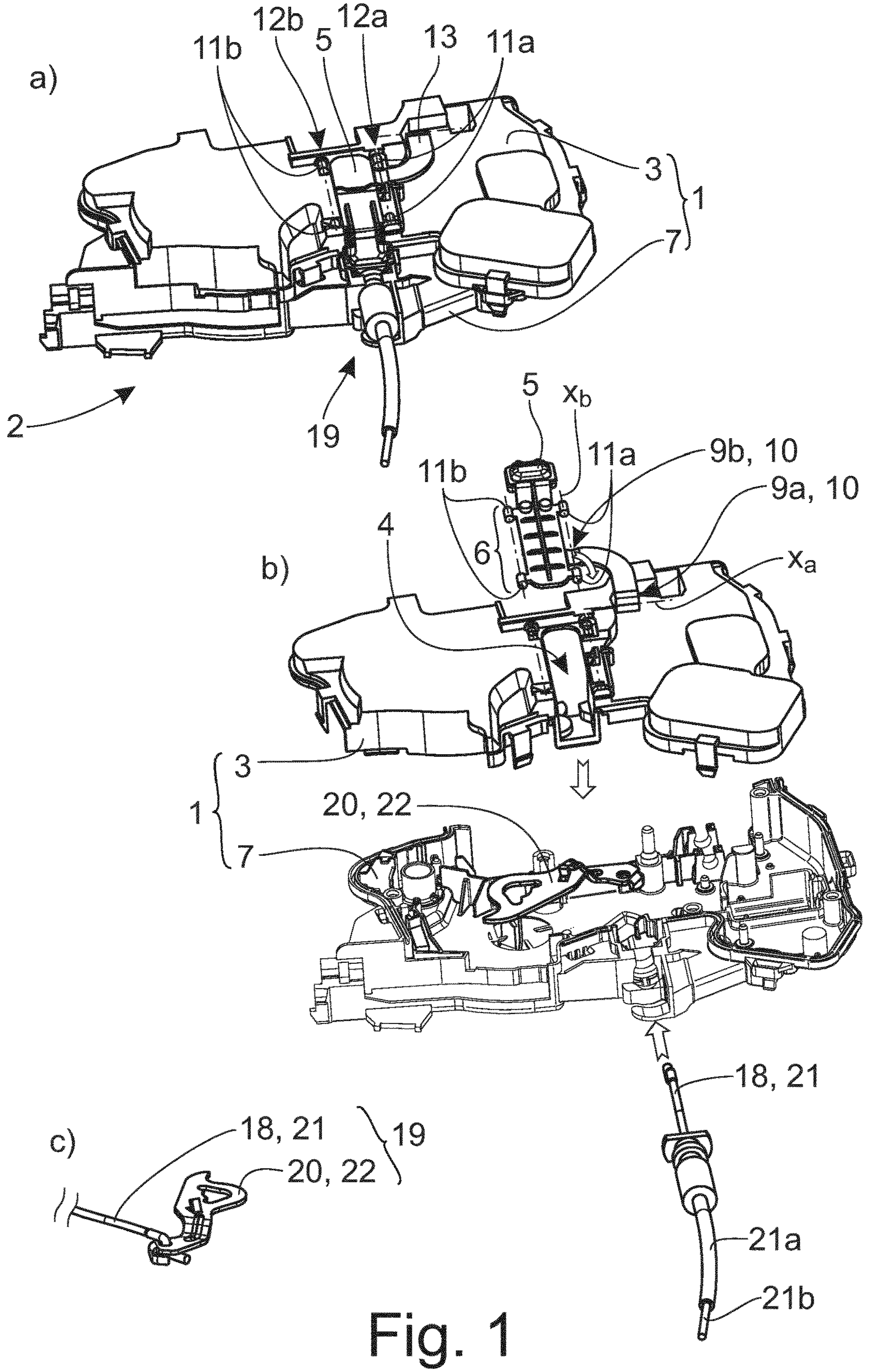

The illustration according to FIGS. 1*a*) and *b*) shows that the component housing 1 has a housing part 3, here a housing upper part, with an installation opening 4. Furthermore, the component housing 1 has a covering part 5 with a cover portion 6, which is designed for at least partially, such as completely, closing the installation opening 4. FIG. 1*a*) shows the state in which the covering part 5 closes the installation opening 4, whereas FIG. 1*b*) shows the unclosed installation opening 4.

In FIG. 1*b*) it is further illustrated that, here, the component housing 1 also has another housing part 7 in the form of a housing lower part which, during the installation, is brought together with the housing part 3 forming the housing upper part. In the interior of the component housing 1, i.e. in this case between the housing parts 3 and 7, a plurality of components which serve the respective function within a motor vehicle lock system are arranged in the installed state. An example of this is a locking mechanism (not shown for reasons of clarity) with a lock latch and a pawl which interact with each other in a manner customary per se.

The component housing 1 or the motor vehicle lock component 2 is arranged in the installed state, for example, in a motor vehicle door or a portion of the body of the motor vehicle.

It is now essential that the component housing 1 has a hinge arrangement 8 with at least one hinge 9*a*, 9*b*, by which the covering part 5 is movably connected to the housing part 3 in a starting position (FIG. 2*a*), FIG. 3*a*)), in which the covering part 5 is spaced apart from the installation opening 4 and releases same. It is also essential that the hinge arrangement 8 has at least one film hinge 10 as a hinge 9*a*, 9*b*. In addition, it is essential that, with the involvement of the at least one film hinge 10, the covering part 5 can be brought out of the starting position into at least two different latching positions (FIGS. 2 *b*) and *d*), FIGS. 3*b*) and *d*)), in which the covering part 5 is in each case latched to the housing part.

Figure 2:
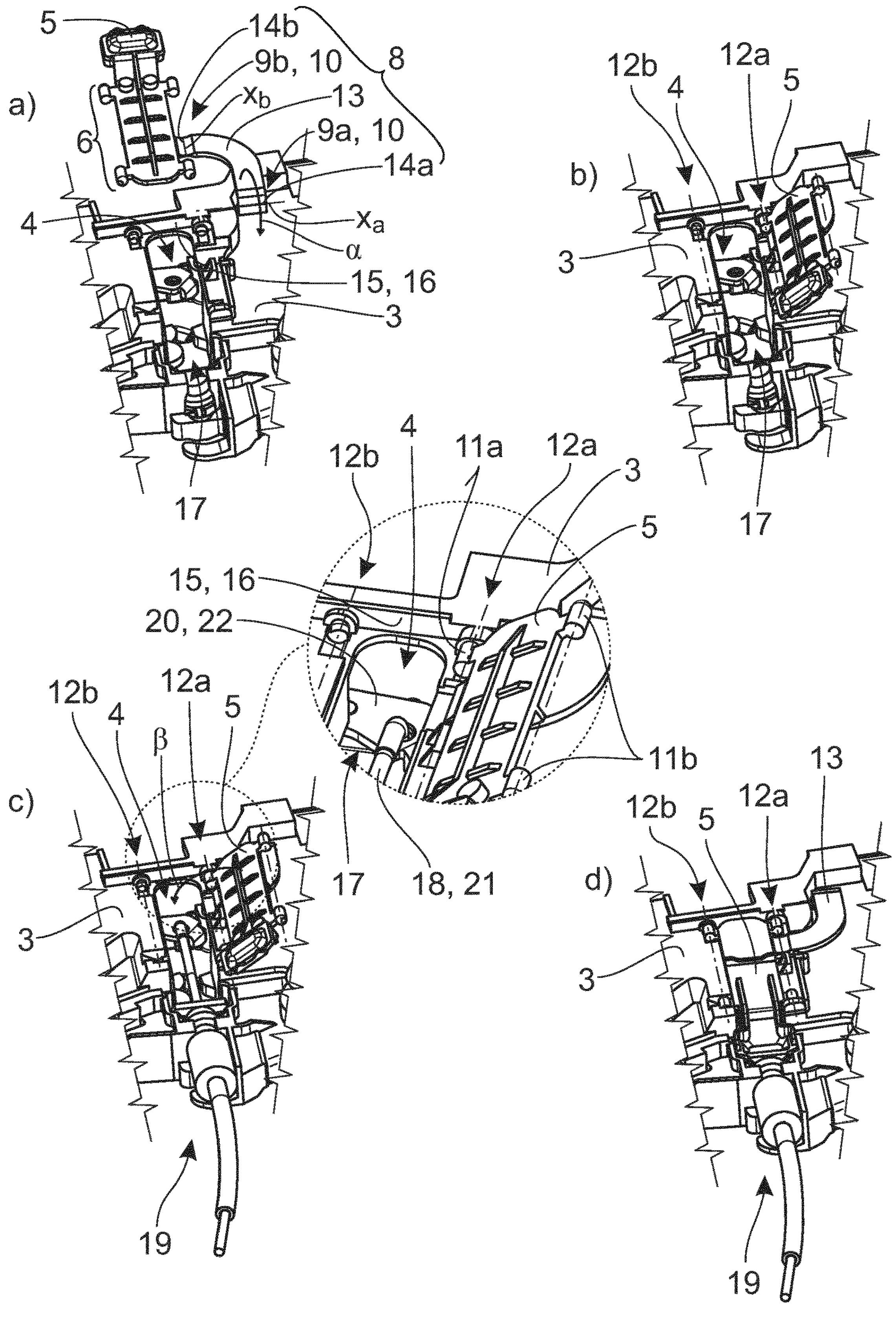
FIG. 2 shows an enlarged detailed view of the motor vehicle lock component according to FIG. 1 a) before installation, b) after an installation step, c) after a further installation step and d) after installation.
Figure 3:
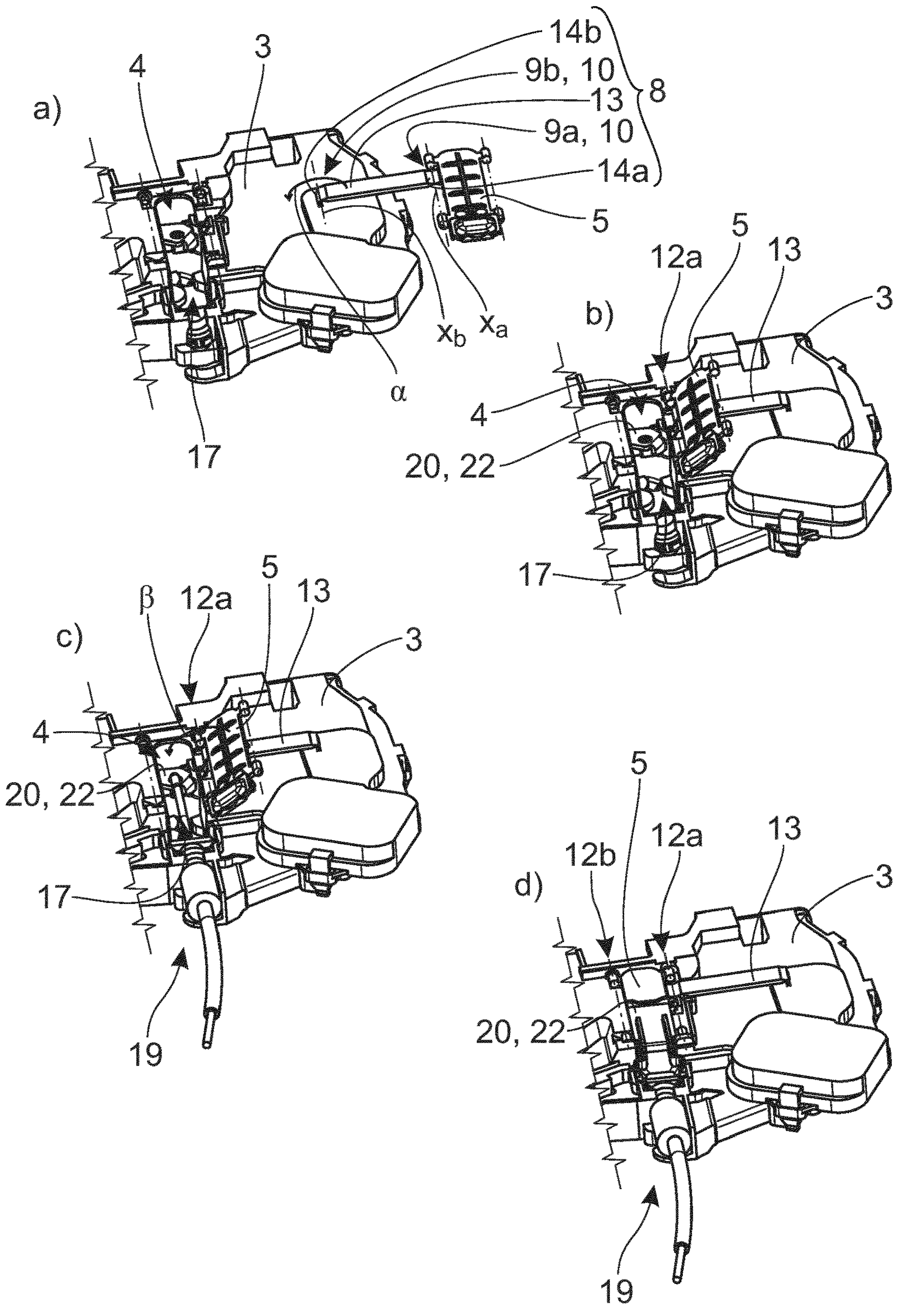
FIG. 3 shows an enlarged detailed view of a further exemplary embodiment of a motor vehicle lock component according to the proposal a) before installation, b) after an installation step, c) after a further installation step, and d) after installation.

"Different latching positions" here means that the latching positions differ from one other in the manner in which the covering part 5 is latched to the housing part 3. Thus, as shown in FIGS. 2 and 3, two separate latching mechanisms 11*a*, 11*b* are provided, which are used here successively. The respective latching mechanism 11*a*, 11*b* has latching elements on one of the parts, here on the covering part 5, and corresponding mating latching elements on the respective other of the parts, here on the housing part 3, which can be brought into latching engagement with each other to bring about the latching in the respective latching position.

By providing two latching positions or latching mechanisms 11*a*, 11*b*, it is possible to arrange the covering part 5 in its starting position relative to the housing part 3 such that the covering part 5 does not protrude or does not significantly protrude from the upper side of the housing part 3, in particular when the housing part 3 is stored or transported. The upper side here refers to the outside of the housing part 3, which points in the direction from which the covering part 5 is placed into or onto the installation opening 4. Latching of the covering part 5 to the housing part 3 also takes place on this side. In various embodiments, the covering part 5 in the said starting position is also latched to the housing part 3.

FIGS. 2*b*) and 3*b*) show the motor vehicle lock component 2 according to the proposal after the covering part 5 has been brought out of its starting position into a first of the latching positions. By means of this installation step, the component housing 1 is prepared for a subsequent installation step in which a mechanical connection also has to be made (FIG. 2*c*), FIG. 3*c*)), which is described below. After that, the installation opening 4 then only has to be closed by the covering part 5 (FIG. 2*d*), FIG. 3*d*)), which takes place here by folding over the covering part 5. For this purpose, here, the covering part 5 can be brought from a first of the latching positions shown in FIGS. 2*b*) and *c*) and 3*b*) and *c*), while maintaining the latching of the covering part 5 to the housing part 3, into a second of the latching positions shown in FIG. 2*d*) and FIG. 3*d*). In particular, the covering part 5 is pivotable from the first latching position into the second latching position. Here, the covering part 5 is first of all brought from the starting position into the first latching position and then from there into the second latching position.

As shown in FIGS. 2*b*) and 3*b*), here, in the one, in particular first, latching position, the covering part 5 further releases the installation opening 4. In the other, in particular second, latching position, the covering part 5, as shown in FIGS. 2*d*) and 3*d*), closes the installation opening at least partially, in particular completely. In the case of completely closing it, the housing interior can be sealed against moisture in relation to the environment of the component housing 1.

Here, in the one, here the first, latching position, the covering part 5 is latched on a first side 12*a* of the installation opening 4 to the housing part 3. In the other, here the second, latching position, the covering part 5 is additionally latched on another side 12*b* of the installation opening 4, in particular opposite the first side 12*a*, to the housing part 3. As already previously explained, for the purpose of producing the latching in each case on the first side 12*a* and the second side 12*b*, one or more latching elements on the covering part 5 and mating latching elements on the housing part 3 intermesh in a latching manner with one other. In addition or alternatively, it is also conceivable that one or more latching elements on the housing part 3 and corresponding mating latching elements on the covering part 5 intermesh.

The hinge arrangements 8 will now to be described in more detail below.

Here, the respective hinge arrangement 8 has at least two, here precisely two, hinges 9*a*, 9*b* with different, i.e. non-coaxial, geometric hinge axes $x_a$, $x_b$. Of the at least two hinges 9*a*, 9*b*, at least one is a film hinge 10, as has already been previously described. Here, at least two hinges, in particular all the hinges, of the hinge arrangement 8 are film hinges 10.

Alternatively, however, it is also conceivable that at least one hinge 9*a*, 9*b* of the hinge arrangement 8 is a rotary hinge and/or at least one hinge 9*a*, 9*b* of the hinge arrangement 8 is a ball and socket joint. A "rotary hinge" is a hinge with two separate hinge wings, i.e. not formed integrally with each other, which are movably connected by a pin or journal, wherein the pin or journal defines the geometric hinge axis $x_a$, $x_b$ about which the two hinge wings can be pivoted with respect to each other. A "ball and socket joint" is a joint with two ball and socket joint parts, in particular a ball and a ball socket.

Instead of a hinge, the hinge arrangement 8 can furthermore also have at least one predetermined breaking point between the covering part 5 and the hinge arrangement 8. At a predetermined breaking point, the connection between the covering part 5 and the hinge arrangement 8 is furthermore deliberately destroyed, in particular when the covering part 5 is brought, in particular pivoted, from the starting position into the first latching position or from the first latching position into the second latching position.

Here, however, the covering part 5 can be brought from the starting position 5 into the one, in particular first, latching position and/or from the one, in particular first, latching position into the other, in particular second, latching position, without destroying the hinge arrangement 8, in particular a joint portion 14*a*, 14*b* of the hinge arrangement 8. A "joint portion" refers to the movable portion between the hinge wings, which, in the case of a film hinge, is the material section which is particularly flexible in relation to the hinge wings. A non-destructive actuation of the hinge arrangement 8 has the advantage that the covering part 5 can be removed again from the installation opening 4 and remains captively on the housing part 3 via the hinge arrangement 8.

The hinge arrangement, as mentioned, is constructed such that the two hinges 9*a*, 9*b* have different, i.e. non-coaxial, geometric hinge axes $x_a$, $x_b$. Here, in the exemplary embodiment in FIGS. 1 and 2, the at least two hinges 9*a*, 9*b* have angled, here in particular orthogonal, but optionally also oblique, hinge axes $x_a$, $x_b$ with respect to one another. In the exemplary embodiment in FIG. 3, on the other hand, the at least two hinges 9*a*, 9*b* have hinge axes $x_a$, $x_b$ which are parallel to one another.

In this case, the hinge arrangement has a dimensionally stable connecting piece 13 between the two geometric hinge axes $x_a$, $x_b$. In both exemplary embodiments, the housing part 3 and the dimensionally stable connecting piece 13 together with the respective joint portion 14*a* connecting them form a first of the hinges, namely the hinge 9*a*, and the covering part 5 and the dimensionally stable connecting piece 13 together with the respective joint portion 14*b* connecting them form a second of the hinges, namely the second hinge 9*b*. The dimensionally stable connecting piece 13 thus can form a joint hinge wing for the two hinges 9*a*, 9*b*.

A "dimensionally stable" connecting piece 13 refers here to a material portion of the respective hinge 9*a*, 9*b* which is less flexible than the joint portions 14*a*, 14*b*. This material portion is not deformed or not significantly deformed when used as intended. Said dimensionally stable connecting piece 13 can be curved in the exemplary embodiment according to FIGS. 1 and 2 and rectilinear in the exemplary embodiment according to FIG. 3. In the case of the curved connecting piece 13, the curvature runs between the two hinges 9*a*, 9*b* such that they have hinge axes $x_a$, $x_b$ which are orthogonal with respect to each other here.

Furthermore, here, in both exemplary embodiments, the covering part 5 together with the dimensionally stable connecting piece 13 is pivotable relative to the housing part 3 about the geometric hinge axis $x_a$ of the first hinge 9*a* from the starting position into the one, in particular first, latching position, in particular about a pivot angle $\alpha$ of at least 160°, of at least 170°, or of at least 180°. In addition or alternatively, provision may be made, as here, that the covering part 5 is pivotable relative to the housing part 3, in particular without further pivoting of the dimensionally stable connecting piece 13 relative to the housing part 3, about the geometric hinge axis $x_b$ of the second hinge 9*b* from the one, in particular first, latching position into the other, in particular second, latching position, in particular about a pivot angle $\beta$ of at least 90°, of at least 110°, or of at least 130°.

As shown in FIG. 2, a housing portion 15 which protrudes in relation to the upper side of the housing part 3 may also be provided. Such a housing portion 15 is, as here, for example, a reinforcement strut 16 of the housing part 3. In particular, the housing portion 15 extends as far as the edge of the installation opening 4. The hinge arrangement 8 can then be designed such that it guides the covering part 5, when moving from the starting position in the direction of the first latching position, past the housing portion 15.

Here, the covering part 5 in the second latching position covers a space portion 17 of the housing interior that is accessible from the outside via the installation opening 4. In this space portion 17, in the installed state, a first train component 18 of a drive train 19 of the motor vehicle lock component 2, which train component is guided from the outside into the space portion 17, is coupled in terms of drive to a second train component 20 of the drive train 19, which train component is movably mounted in the space portion 17. Here, the first train component 18 is a Bowden cable 21. The latter has, in a customary manner per se, a Bowden cable sheath 21*a* and a Bowden cable core 21*b* guided axially movably therein. In the two exemplary embodiments, the Bowden cable sheath 21*a* is fixed to the housing part 3 and the Bowden cable core 21*b* is coupled to the second train component 20. The second train component 20 can be an actuating lever 22.

It is noteworthy in the two exemplary embodiments that, in the installed state, the covering part 5 in the second latching position secures the Bowden cable 21, in particular the Bowden cable sheath 21*a*, in some embodiments on the housing part 3. For this purpose, the covering part 5 is angled or curved at one end toward the Bowden cable 21 and thus enters into axially form-fitting engagement with the Bowden cable 21, in particular the Bowden cable sheath 21*a*. As a result, the Bowden cable 21, in particular the Bowden cable sheath 21*a*, cannot be unintentionally removed from the housing part 3. Furthermore, however, the covering part 5 in the first latching position releases the Bowden cable 21, in particular the Bowden cable sheath 21*a*.

According to a further teaching, a motor vehicle lock component, in particular a motor vehicle lock or an opening or closing aid assigned to a motor vehicle lock, is provided, having a drive train 19, which has a plurality of train components 18, 20 coupled to one another in terms of drive, for actuating a locking mechanism having a pawl and a lock latch, and having a component housing 1 according to the proposal, in which the first train component 18 of the drive train 19, in particular the Bowden cable 21, is coupled in terms of drive to the second train component 20 of the drive train 19, in particular to the actuating lever 22. In this respect, reference may be made to all the statements regarding the component housing 1 according to the proposal.

Here, it is the case that, in the installed state, the Bowden cable 21, in particular via the actuating lever 22, upon the actuation thereof, in particular a motorized or manual actuation, brings about lifting of the pawl out of an engagement position, in which it blocks the lock latch in a locking position against opening in the direction of its open position, or it causes the lock latch to be pushed open from a locking position or the lock latch to be pulled into a locking position.

According to a further teaching, a method for the installation of a motor vehicle lock component 2 according to the proposal is provided. This is shown schematically in FIG. 1. In this respect, reference may be made to all the statements regarding the component housing 1 according to the proposal and to the motor vehicle lock component 2 according to the proposal.

In this case, the housing part 3 is firstly provided with the covering part 5 which is in the starting position.

The first train component 18 of the drive train 19, in particular the Bowden cable 21, is then guided from the outside into the space portion 17 and coupled in terms of drive to the second train component 20 of the drive train 19, in particular to the actuating lever 22.

Before or after the insertion of the Bowden cable 21 from the outside into the space portion 17, the covering part 5 from and beyond the starting position is latched in the one, in particular first, latching position, with the involvement of the at least one film hinge 10.

After the insertion of the Bowden cable 21 from the outside into the space portion 17 and after the latching of the covering part 5 in the one, in particular first, latching position, the covering part 5 is latched in the other, in particular second, latching position, at least partially closing the installation opening 4, with the involvement of the at least one film hinge 10.

The invention claimed is:

1. A component housing for a motor vehicle lock component of a motor vehicle, wherein the component housing has a housing part with an installation opening and a covering part with a cover portion, which is configured to at least partially close the installation opening, wherein the component housing has a hinge arrangement with at least one hinge, by which the covering part, in a starting position in which the covering part is spaced apart from the installation opening and releases same, is movably connected to the housing part, wherein the hinge arrangement has at least one film hinge as a hinge, and wherein, with the involvement of the at least one film hinge, the covering part is configured to be brought out of the starting position into at least two different latching positions in which the covering part is in each case latched to the housing part, wherein in the one latching position, the covering part further releases the installation opening and in the other latching position, the covering part at least partially closes the installation opening.

2. The component housing as claimed in claim 1, wherein the covering part is configured to be brought out of a first of the latching positions, while maintaining the latching of the covering part to the housing part, into a second of the latching positions.

3. The component housing as claimed in claim 2, wherein the covering part is configured to be brought out of the starting position firstly into the first latching position and then into the second latching position.

4. The component housing as claimed in claim 1, wherein the hinge arrangement has at least two hinges with different geometric hinge axes, of which at least one is a film hinge, or in that at least one hinge of the hinge arrangement is a rotary hinge and/or at least one hinge of the hinge arrangement is a ball and socket joint, and/or wherein the hinge arrangement furthermore has at least one predetermined breaking point between the covering part and the hinge arrangement.

5. The component housing as claimed in claim 1, wherein the covering part is configured to be brought out of the starting position into the one latching position and/or out of the one latching position into the other latching position without destroying the hinge arrangement.

6. The component housing as claimed in claim 1, wherein the hinge arrangement has a dimensionally stable connecting piece.

7. The component housing as claimed in claim 6, wherein the dimensionally stable connecting piece is curved or rectilinear.

8. The component housing as claimed in claim 6, wherein the covering part is pivotable together with the dimensionally stable connecting piece relative to the housing part about the geometric hinge axis of a first hinge from the starting position into the one latching position, and/or wherein the covering part is pivotable relative to the housing part about the geometric hinge axis of a second hinge from the one latching position into the other latching position.

9. The component housing as claimed in claim 6, wherein the housing part and the dimensionally stable connecting piece together with the respective joint portion connecting them form a first of the hinges and in that the covering part and the dimensionally stable connecting piece together with the respective joint portion connecting them form a second of the hinges.

10. The component housing as claimed in claim 6, wherein the covering part is pivotable together with the dimensionally stable connecting piece relative to the housing part about the geometric hinge axis of the first hinge from the starting position into the one latching position about a pivot angle of at least 160°, and/or wherein the covering part is pivotable relative to the housing part without further pivoting of the dimensionally stable connecting piece relative to the housing part, about the geometric hinge axis of the second hinge from the one latching position into the other latching position about a pivot angle of at least 90°.

11. The component housing as claimed in claim 1, wherein the hinge arrangement guides the covering part, when moving from the starting position in the direction of the first latching position, past a housing portion which protrudes in relation to the upper side of the housing part and which extends as far as the edge of the installation opening.

12. The component housing as claimed in claim 11, wherein the housing portion is a reinforcement strut of the housing part.

13. A motor vehicle lock component, having a drive train, which has a plurality of train components coupled to one another in terms of drive, for actuating a locking mechanism having a pawl and a lock latch, and having a component housing as claimed in claim 1, in which the first train component of the drive train is coupled in terms of drive to the second train component of the drive train.

14. The motor vehicle lock component as claimed in claim 13, wherein, in the mounted state, a Bowden cable upon the actuation thereof brings about lifting of the pawl out of an engagement position, in which it blocks the lock latch in a locking position against opening in the direction of its open position, or it causes the lock latch to be pushed out of a locking position or the lock latch to be pulled into a locking position.

15. A method for installing a motor vehicle lock component as claimed in claim 14, wherein the housing part is provided with the covering part in the starting position, in that the first train component of the drive train is then guided from the outside into the space portion and coupled in terms of drive to the second train component of the drive train, wherein, before or after the insertion of the Bowden cable from the outside into the space portion, with the involvement of the at least one film hinge, the covering part from and beyond the starting position is latched in the one latching position, and wherein, after the Bowden cable is inserted from the outside into the space portion and after the covering part is latched in the one latching position, with the involvement of the at least one film hinge, the covering part is latched in the other latching position, at least partially closing the installation opening.

16. The component housing as claimed in claim 1, wherein the hinge arrangement has at least two hinges with different geometric hinge axes, of which at least two are film hinges, or wherein at least one hinge of the hinge arrangement is a rotary hinge and/or at least one hinge of the hinge arrangement is a ball and socket joint, and/or wherein the hinge arrangement furthermore has at least one predetermined breaking point between the covering part and the hinge arrangement.

17. A component housing for a motor vehicle lock component of a motor vehicle, wherein the component housing has a housing part with an installation opening and a covering part with a cover portion, which is configured to at least partially close the installation opening, wherein the component housing has a hinge arrangement with at least one hinge, by which the covering part, in a starting position in which the covering part is spaced apart from the installation opening and releases same, is movably connected to the housing part, wherein the hinge arrangement has at least one film hinge as a hinge, and wherein, with the involvement of the at least one film hinge, the covering part is configured to be brought out of the starting position into at least two different latching positions in which the covering part is in each case latched to the housing part, wherein in the one latching position, the covering part is latched to the housing part on a first side of the installation opening and in the other latching position, the covering part is additionally latched to the housing part on another side of the installation opening.

18. A component housing for a motor vehicle lock component of a motor vehicle, wherein the component housing has a housing part with an installation opening and a covering part with a cover portion, which is configured to at least partially close the installation opening, wherein the component housing has a hinge arrangement with at least one hinge, by which the covering part, in a starting position in which the covering part is spaced apart from the installation opening and releases same, is movably connected to the housing part, wherein the hinge arrangement has at least one film hinge as a hinge, and wherein, with the involvement of the at least one film hinge, the covering part is configured to be brought out of the starting position into at least two different latching positions in which the covering part is in each case latched to the housing part, wherein the hinge arrangement comprises at least two hinges that have hinge axes which are angled with respect to one another or are parallel to one another.

19. A component housing for a motor vehicle lock component of a motor vehicle, wherein the component housing has a housing part with an installation opening and a covering part with a cover portion, which is configured to at least partially close the installation opening, wherein the component housing has a hinge arrangement with at least one hinge, by which the covering part, in a starting position in which the covering part is spaced apart from the installation opening and releases same, is movably connected to the housing part, wherein the hinge arrangement has at least one film hinge as a hinge, and wherein, with the involvement of the at least one film hinge, the covering part is configured to be brought out of the starting position into at least two different latching positions in which the covering part is in each case latched to the housing part, wherein the covering part in the second latching position covers a space portion of the housing interior that is accessible from the outside via the installation opening, in which space portion, in the mounted state, a first train component of a drive train of the motor vehicle lock component, which train component is guided from the outside into the space portion, is coupled in terms of drive to a second train component of the drive train, which train component is movably mounted in the space portion.

* * * * *